United States Patent [19]

Bernett et al.

[11] 3,940,358

[45] *Feb. 24, 1976

[54] NON-HYDRAULIC GROUTING COMPOSITION OF A WATER RESISTANT POLYMER EMULSION AND A MIXTURE OF A COARSE AND A FINE FILLER

[75] Inventors: Frank E. Bernett, Yardley, Pa.; Robert J. Kleinhans, Kingston, N.J.

[73] Assignee: Tile Council of America, Inc., Princeton, N.J.

[ * ] Notice: The portion of the term of this patent subsequent to Dec. 19, 1989, has been disclaimed.

[22] Filed: Dec. 13, 1972

[21] Appl. No.: 314,552

Related U.S. Application Data

[60] Continuation-in-part of Ser. No. 270,239, Sept. 15, 1972, abandoned, which is a division of Ser. No. 10,018, Feb. 9, 1970, abandoned.

[52] U.S. Cl............ 260/29.6 R; 52/390; 260/17 R; 260/17.4 BB; 260/17.4 SG; 260/29.6 MM; 260/29.6 ME; 260/29.7 R
[51] Int. Cl.²......................................... C08L 47/00
[58] Field of Search.. 260/29.6 R, 29.6 S, 29.6 MM, 260/29.6 ME

[56] References Cited
UNITED STATES PATENTS

| | | | |
|---|---|---|---|
| 2,311,233 | 2/1943 | Jaenicke et al................. | 260/29.6 S |
| 2,536,375 | 1/1951 | Koehn et al.................... | 260/29.6 S |
| 2,646,846 | 7/1953 | Cutforth......................... | 260/29.6 S |
| 2,882,252 | 4/1959 | Stefanik........................ | 260/27 R |
| 3,025,256 | 3/1962 | Janota et al................... | 260/29.6 S |
| 3,196,122 | 7/1965 | Evans............................ | 260/29.6 S |
| 3,256,229 | 6/1966 | Janota et al................... | 260/29.6 S |
| 3,421,584 | 1/1969 | Eilers et al..................... | 166/33 R |
| 3,706,696 | 12/1972 | Bernett et al................. | 260/29.6 R |

FOREIGN PATENTS OR APPLICATIONS

623,314  1/1963  Belgium

*Primary Examiner*—Harold D. Anderson
*Attorney, Agent, or Firm*—Morgan, Finnegan, Pine, Foley & Lee

[57] ABSTRACT

A new and improved grouting composition for impervious tile is provided which comprises not less than 50 per cent by weight of an inert filler aggregate which shall be graded with not more than 10 per cent passing a number 140 sieve and none retained on a number 6 sieve and an AFS Grain Fineness Number less than 100, but greater than 30; a water-resistant polymer emulsion having a solids content of at least 40 per cent and providing 7 to 15 per cent by weight of polymeric solids; volatile components from 5 to 15 per cent by weight and 10 to 35 per cent by weight of fine fillers which shall have an average particle size less than 140 mesh. In addition, a method for grouting impervious tiles employing such composition is also provided.

16 Claims, No Drawings

NON HYDRAULIC GROUTING COMPOSITION OF A WATER RESISTANT POLYMER EMULSION AND A MIXTURE OF A COARSE AND A FINE FILLER

CROSS-REFERENCE TO RELATED APPLICATIONS

This application is a continuation-in-part application of U.S. application Ser. No. 270,239 filed Sept. 15, 1972, now abandoned, which is a divisional of U.S. Ser. No. 10,018 filed Feb. 9, 1970, now abandoned.

BACKGROUND OF THE INVENTION

Generally stated, the subject matter of the present invention relates to a preconstituted grouting composition especially suited for impervious tiles. More particularly, the invention relates to a preconstituted grouting composition for impervious tiles which comprises not less than 50 per cent by weight of an inert aggregate having particular physical and chemical properties and a water-resistant polymer emulsion.

The grouting compositions generally employed by the ceramic tile industry for impervious tiles usually comprise a Portland cement base and enjoy a wide acceptance as a grout because of their low cost and ease of application. The compositions are also relatively permanent, non-toxic and inert.

While such compositions are characterized as enjoying a wide acceptance in the industry, their inherent shortcomings have resulted in a substantial decline in the use of ceramic tile as a covering for flexible floors. Consider that the composition is usually prepared at the job site just prior to use. Therefore, the grout is subject to a variety of individual mixing techniques which results in a lack of uniformity of the cured grout. The composition also has a short pot life, that is, the period of time in which the reconstituted composition begins to harden, as well as being subject to staining because of permeability. In addition, the finished grout is subject to deterioration, that is, cracking or popping up, as a consequence to such factors as shrinkage, dimensional instability of building parts and heavy traffic when employed as a grout for floor tiles. Lastly, such compositions require special conditions of temperature, time and especially moisture to cure properly.

Most attempts to overcome such deficiencies of the grouting composition have thus far been unsuccessful. Many different varieties of a Portland cement base grouting composition have been formulated in which such materials as latex, epoxy and furan type resins have been employed as additives. However, such modified compositions are subject to the same inherent disadvantages as the conventional composition. Lastly, attempts to use the recently developed preconstituted, latex, absorptive-tile grouting composition disclosed and claimed in U.S. Pat. No. 3,706,696 to be granted Dec. 19, 1972 and having a common assignee, has resulted in a grout which is esthetically unacceptable on curing as a consequence to the formation of pit holes and a roughness of the cured surface.

The present invention represents the culmination of a long series of investigations directed to overcome the inherent deficiencies of the conventional grouting composition without materially sacrificing its advantages.

The objective which was sought to be achieved was a preconstituted grouting composition for impervious tile which on curing would result in an esthetically acceptable grout having sufficient structural integrity to withstand heavy traffic when employed with an impervious floor tile, as well as assuring uniform results by eliminating the variable of individual mixing techniques.

Accordingly, it is a primary object of the present invention to provide an improved grouting composition which possesses the advantages of the conventional Portland cement base grouting composition without any of the inherent disadvantages of such compositions.

Another object of the present invention is to provide a preconstituted grouting composition for impervious tile which can be easily applied and which has sufficient impermeability to resist staining.

It is another object of this invention to provide an improved grouting composition for impervious tile which has sufficient structural integrity so as to provide a high load bearing surface when employed as a grout for floor tiles.

Yet a further object of this invention is to provide a preconstituted grouting composition for impervious tiles which will cure without special conditions other than the ability to lose water by evaporation.

It may be generally stated that the object of the present invention is to provide a preconstituted grouting composition for impervious tile which is esthetically and structurally acceptable on curing, has sufficient impermeability to resist staining, can be easily applied, resulting in a uniform grout, is sufficiently low enough in cost to be competitive with the conventional composition, as well as being relatively permanent and inert.

Additional objects and advantages of the invention will be set forth in part in the description which follows, and in part will be obvious from the description, or may be realized by the practice of the invention, the objects and advantages being realized and attained by means of the methods, processes, instrumentalities and combinations particularly pointed out in the appended claims.

THE INVENTION

To achieve the foregoing objects and in accordance with its purpose, as embodied and broadly described, the present invention relates to an improved, preconstituted grouting composition for impervious tiles which comprises not less than 50 per cent by weight of an inert filler aggregate which shall be graded with not more than 10 per cent passing a number 140 sieve and none retained on a number 6 sieve and an AFS Grain Fineness Number less than 100, but greater than 30; a water-resistant polymer emulsion having a solids content of at least 40 per cent and providing 7 to 15 per cent by weight of polymeric solids; volatile components (including the water in the emulsion) from 5 to 15 per cent by weight and 10 to 35 per cent by weight of fine fillers which shall have an average particle size less than 140 mesh.

The Grain Fineness Number is approximately the number of meshes per inch of that sieve which would just pass the sample if its grains were of uniform size, that is, the average of the sizes of grains in the sample. Calculation of it is according to a standard AFS method.

The present invention also provides a novel combination comprising a surface coated with impervious tile and the grouting composition of the present invention, as well as an improved method of grouting impervious tile employing the novel grouting composition of the present invention.

The invention consists of the novel methods, processes, steps and improvements herein shown and described. It is to be understood that both the foregoing general description and the following detailed description are exemplary and explanatory and are not restrictive of the invention.

Therefore, the present invention provides a unitary, preconstituted grouting composition for impervious tiles which comprises the combination of water-resistant polymer emulsion, inert filler aggregate, fine filler and a minimal amount of volatile fluids.

The inert filler aggregate may be silica sand, crushed limestone, or other clean inert material. The inert filler aggregate component of the composition may comprise one, or a combination of clean inert materials. The ultimate criteria of the component being that such component be graded with not more than about 10 per cent passing a number 140 sieve and none retained on a number 6 sieve, as well as having an AFS Grain Fineness Number (American Foundry Society) of less than 100 but greater than 30.

The fine filler material on the other hand should have an average particle size which is less than 140 mesh, and may include pigments, inert materials such as limestone, alumina, alumina trihydrate, ground silica, certain fine sands, zinc oxide, titanium dioxide, talc, clays and the like.

While specialized filler/water resistant polymer systems are available for caulking, filleting and the like, such compositions have physical properties which render them totally useless as grouting compositions. Consider caulking compositions which are employed as tub caulk, and expansion and control joint fillers, to mention but a few of their applications. Such compositions have extremely slow hardening and water-loss properties, and usually retain a putty-like consistency over periods as long as several years. Additionally, such compositions have great extendibility as well as a residual flexibility and pliability. Lastly, when the compositions have dried, they are brittle and will readily crack on shrinkage or movement.

The water resistant polymer emulsions employed in the present invention usually consist of a disperse phase containing minute droplets of the polymer and an external continuous phase of water. The polymers are typically prepared by emulsion polymerization which proceeds by a free radical mechanism. The monomers are ethylenically unsaturated compounds represented by the following general formula:

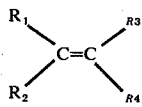

wherein $R_1$, $R_2$, $R_3$, and $R_4$ may be hydrogen, halogen, alkyl, aryl, alkylene, esterified carboxyls, and the like. In most instances at least two hydrogen atoms are linked directly to the ethylenic carbon atoms and in true vinyl monomers $R_1$, $R_2$, and $R_3$ are all hydrogen.

Vinyl acetate, vinyl chloride, acrylonitrile, vinylidene chloride, styrene, butadiene, alkyl acrylate, alkyl methacrylate, alkyl maleate, and alkyl fumarate among others are illustrative of monomers from which water-resistant polymer emulsions found useful by the applicants in the present invention have been prepared.

The resulting polymers may be homopolymeric or copolymeric. They may be straight chained or branched. The present invention contemplates polymers obtained from the aforesaid monomers, mixtures and derivatives thereof. Together with these polymers, can be added a catalyst to accelerate formation of the desired compositions.

The following list of polymers suitable for use herein is only representative of the many kinds which find application:
polyvinyl acetate
polyvinyl chloride
polystyrene
polybutadiene
polymethyl acrylate
styrene-dimethyl maleate copolymer
styrene-dimethyl fumarate copolymer
styrene-butadiene copolymer
butadiene-maleic anhydride copolymer
methylmethacrylate -acrylic acid copolymer
ethyl acrylate - methacrylic acid copolymer
vinyl chloride — ethyl acrylate copolymer
vinyl chloride — acrylic acid copolymer
ethylacrylate — acrylic acid copolymer
methylmethacrylate — acrylic acid copolymer
styrene — diethylmaleate copolymer
vinyl chloride — butylacrylate copolymer
methylmethacrylate — ethylacrylate copolymer
styrene — ethyl acrylate copolymer
vinyl chloride-2-ethylhexyl acrylate copolymer
vinyl acetate — dioctyl fumarate copolymer
acrylonitrile — butadiene copolymer
vinyl acetate — diethyl maleate copolymer When reference is made to the term alkyl, lower alkyl is preferred, i.e., alkyl containing from 1 to 4 carbon atoms.

Generally, the water-resistant polymer emulsions useful in the present invention may be characterized as those emulsions which when admixed with a filler having the physical characteristics herein set forth results in a composition having a viscosity of 100,000 to 2,000,000 cps.

A variety of polymer structures are available through the technology of emulsion polymerization, as for example, straight chain polymers, branched polymers, cross-linked polymers and by the process of additional copolymers which offer wide control of such properties as adhesion, abrasion resistance, elasticity hardness, solvent resistance and durability.

As an additional embodiment of the invention, applicants have found that the addition of materials such as polyhydric alcohols including ethylene glycol, hexylene glycol, glycerine, propylene, glycol, hexitols, sorbitol and mannitol among others, as well as sodium ethyl phosphate, invert sugar and substituted ureas among others, aid in retarding film formation. Therefore, the ease of cleaning excess grouting material from the tile surface is materially enhanced. Such materials may be employed in concentrations ranging from 5 to 30 per cent by weight of the water-resistant polymer emulsion. It is preferred to employ a concentration of from about 10 to 25 per cent Additional additives which aid in the coalescence of the composition and thereby yield cured products exhibiting improved stain resistance and toughness, as well as water resistance may be incorporated. Illustrative of such additives are butoxy-ethyl acetate, ethoxyethyl acetate, butoxy ethoxyethyl acetate, toluene, xylene and the like.

Lastly, additives which control thixotrophy and viscosity characteristics may also be incorporated in the composition. Illustrative of such additives are methyl cellulose, hydroxyethyl cellulose, carboxymethyl hydroxy ethyl cellulose, animal glues, various starches, alginates, polyvinyl alcohol and proteins among others. Crosslinking agents for these additives may be incorporated.

Illustrative of coloring materials which may be incorporated in the composition are titanium dioxide, cadmium red, carbon black, alumina powder and the like.

The following examples are provided for illustrative purposes and may include particular features of the invention. However, the examples should not be construed as limiting the invention, many variations of which are possible without departing from the spirit or scope thereof.

EXAMPLE I

Preparation of the Novel Grouting Composition

This example demonstrates the preparation and testing of a floor grouting composition.

A grout was prepared comprising the following ingredients:

| | |
|---|---|
| Ground Limestone (mean particle diameter of 5 microns) | 75 grams |
| Ground White Silica Sand (average particle size - 325 mesh) | 85 grams |
| Aluminum Trihydrate (mean particle diameter of 30 microns) | 100 grams |
| Silica Sand (average particle size - 70 mesh) | 550 grams |
| AC-33 Acrylic Emulsion by Rohm & Haas 46% solids* | 150 grams |
| Ethylene Glycol | 5 grams |
| Water | 25 grams |
| Potassium Tripolyphosphate | 1 gram |
| Colloid 513DD Antifoaming Agent** | 2 grams |

*The AC-33 Acrylic Emulsion supplied by Rohm & Haas is defined as an acrylic emulsion copolymer based on a major amount of ethyl acrylate and a minor amount of methyl methacrylate in proportions to provide a glass transition temperature of 12°C.
**The Colloid 513 DD Antifoaming Agent supplied by Colloids Inc. is defined as a blend of hydrocarbons and polyglycol-glycol ester combinations supported on an inert carrier.

The composition was prepared by admixing the acrylic emulsion, ethylene glycol, potassium tripolyphosphate and water, adding half the quantity of the antifoaming agent. To this mixture the fillers are slowly added and a grouting composition having good workability was achieved. The composition was used to grout a floor test slab of 1 × 1 inch ceramic mosaic tile set on double plywood underlayment on simulated wood joists. The tiles were set on the plywood using a commercial floor mastic for ceramic tile setting.

The grouting operation was done with a rubber trowel and required no clean-up with water and sponge or dry rags as is necessary for Portland cement base grouts. The floor test slab made and tested according to ASTM test method C.627-69.

The floor endured more test service at higher loads than any mastic set floor-tile test slab similar to it had ever done before with Portland cement or latex-Portland cement grout. After 200 lbs, load on the hard rubber wheels, test cycle Number 6 the grout was in perfect condition even though at this test level tiles were beginning to break. Usually, with Portland cement grouts, the grout is crushed, cracked, and popped up during the 100 lbs. per hard rubber wheel cycle, Number 5.

EXAMPLE II

Preparation of the Novel Grouting Composition

This example demonstrates the preparation and testing of a floor grouting composition.

A grout was prepared comprising the following ingredients:

| | |
|---|---|
| Ground Limestone (mean particle diameter of 5 microns) | 75 grams |
| Ground White Silica (average particle size - 325 mesh) | 90 grams |
| Aluminum Trihydrate (mean particle diameter of 30 microns) | 100 grams |
| Silica Sand (average particle size - 70 mesh) | 540 grams |
| AC-33 Acrylic Emulsion by Rohm & Haas 46% solids* | 160 grams |
| Ethylene Glycol | 5 grams |
| Water | 20 grams |
| Potassium Tripolyphosphate | 1 gram |
| Colloid 513DD Antifoaming Agent** | 2 grams |
| Natrosol Thickener by Hercules Powder Co.*** | 0.2 grams |

*The AC-33 Acrylic Emulsion supplied by Rohm & Haas is defined as an acrylic emulsion copolymer based on a major amount of ethyl acrylate and a minor amount of methyl methacrylate in proportions to provide a glass transition temperature of 12°C.
**The Colloid 513DD Antifoaming Agent supplied by Colloids Inc. is defined as a blend of hydrocarbons and polyglycol-glycol ester combinations supported on an inert carrier.
***The Natrosol Thickener supplied by Hercules Powder Co. is defined as water soluble, hydroxyethyl cellulose polymers employed as thickeners binders, stabilizers and the film formers.

The composition was prepared in substantially the same manner as the grouting composition of Example I, with the addition of the Natrosol after the fillers.

The grouting composition so prepared was used to grout 1 × 1 inch ceramic mosaic tile set with dry-set Portland cement mortar on a concrete slab. The grouting went quickly and a damp sponge was used, after troweling the grout into the joints and wiping the tile clean with the trowel, to polish the tile surface. After 28 days' cure, the slab was tested according to ASTM test method C.627-69. The test slab survived 200 lbs. per steel wheels, test cycle Number 12, as any dry-set installation of the same tile would be expected to do with Portland cement base grout. The grout of this invention was in perfect condition even after the 250 lbs. per steel wheel test cycle, Number 13, had damaged 25% of the tile contacted by the wheels.

EXAMPLE III

This example demonstrates the preparation and testing of a floor grouting composition.

A grout was prepared comprising the following ingredients:

| | |
|---|---|
| Polyvinyl chloride-acrylic copolymer aq-emulsion* | 1432 grams |
| Ethylene glycol | 32 grams |
| Potassium tripoly phosphate | 4 grams |
| Anti-foam | 8 grams |
| Ground limestone (mean particle size of 5 microns) | 592 grams |
| Ground white silica sand | 664 grams |

-continued

| | |
|---|---|
| (Minus 325 mesh) | |
| Hydroxy ethyl cellulose | 2 grams |
| Aluminum trihydrate | 816 grams |
| (mean particle size of 30 microns) | |
| Silica sand | 4440 grams |
| (average particle size of 70 mesh) | |
| Defoamer | 8 grams |
| | 7998 grams |

Viscosity equaled 380,000 cps.
Total aqueous volatile component (water in emulsion plus ethylene glycol) equals 8.5%. The grout worked very well in the joints between ceramic mosaic tile.
*Commercially available from B.F. Goodrich under the tradename "Geon 450x-20."

EXAMPLE IV

This example demonstrates the preparation and testing of a floor grouting composition.

A grout was prepared comprising the folliwing ingredients:

| | |
|---|---|
| Acrylic polymer emulsion* | 652 grams |
| Fine ground silica | 435 grams |
| (mean particle size of 5 microns) | |
| Methylcellulose | 2 grams |
| (Methocel 100 cps., Dow Chemical Co.) | |
| Water | 35 grams |
| Fine sand | 560 grams |
| (average particle size of 140 mesh) | |
| Coarse sand | 859 grams |
| (average particle size of 70 mesh) (AFS = 40) | |
| Colloidal silica | 28 grams |
| (Santocel by Dow Chemical Co.) | |
| Defoamer | 2 grams |
| Total | 3573 grams |

Viscosity equaled 1,800,000 cps. Total aqueous volatile component equals 9.2%. The grout was a little stiff, but it still troweled satisfactorally. It was catalyzed by adding 35 grams of ammonium chloride to the batch. it formed good looking grout joints between ceramic mosaic tile and had excellent water resistance after 7 days cure.
*Thermosetting acrylic polymer emulsion with functional methylol acrylamide - acid crosslinkable - groups, 45% solids, viscosity 30 to 200 cps, pH of 8.5–9.5, surface tension of 46 dynes per cm., and capable of forming flexible films, with a modulus of E=6.5 × $10^3$ psi. after drying and then baking at 350°F for 30 minutes. An example of this general type of polymer that worked is Rhoplex E172, supplied by Rohm and Haas Co., Independence Mall West, Philadelphia, Pennsylvania 19105.

EXAMPLE V

The following grout comprises:

| | |
|---|---|
| The following grout comprises: | |
| Butadiene-styrene copolymer emulsion* | 150 grams |
| Water | 22 grams |
| Surfactant | 2 grams |
| Powdered Limestone | 325 grams |
| (mean particle size of 5 microns) | |
| Sand | |
| (average particle size of 70 mesh) | 500 grams |
| Defoamer | 1 gram |
| | 1000 grams |

It is used to grout joints between impervious tile or vitreous tile and provides acceptable wear, stain and esthetic properties, and mild water-resistance.
*Dow Chemical Company emulsion, Dow-460.

EXAMPLE VI

In the composition of example V, a polyvinyl acetate aq. emulsion is substituted for the Butadiene-styrene copolymer emulsion, and 15 grams of water are replaced by ethylene glycol. A suitable grout for ceramic mosaic tile is obtained.

EXAMPLE VII

In the composition of example V, an acrylate copolymer aqueous emulsion AC-490 (tradename for a commercially available material sold by Rohm and Haas) is substituted for the Butadiene-styrene copolymer emulsion, and 15 grams of water are replaced by ethylene glycol. A suitable grout for ceramic mosaic tile is obtained.

What is claimed is:

1. A non-hydraulic grouting composition which consists essentially of
   a water-resistant polymer emulsion having a solids content of at least 40% by weight of the emulsion wherein the polymer is a polymer of an ethylenically unsaturated monomer;
   10% to 35% by weight of the total composition of a fine filler having an average particle size less than 140 mesh;
   at least 50% by weight of the total composition of a coarse filler characterized by an average particle size wherein not more than 10% passes a 140 sieve and none is retained on a number 6 sieve and an American Foundry Society grain Fineness Number less than 100 but greater than 10;
   wherein the total composition has a viscosity of 50,000 to 2,000,000 cps, a total fine and coarse filler content of from about 70% to 90% by weight, and a total aqueous volatile component content of from 5% to 15% by weight.

2. The composition according to claim 1 wherein the coarse filler is silica sand.

3. The composition according to claim 1 wherein the fine filler is silica sand.

4. The composition according to claim 1 wherein the fine filler is limestone.

5. The composition according to claim 1 wherein the fine filler is aluminum trihydrate.

6. The composition according to claim 1 wherein the fine filler is a mixture of silica sand, limestone and aluminum trihydrate.

7. The composition according to claim 1 wherein the water-resistant polymer is a copolymer consisting of a major amount of ethyl acrylate and a minor amount of methyl methacrylate in proportions sufficient to provide a glass transition temperature of 12°C.

8. A composition according to claim 1 consisting essentially of from about 5 to 30 per cent of a polyhydric alcohol based on the weight of the water-resistant polymer emulsion.

9. The composition according to claim 8 in which the concentration of the polyhydric alcohol is from about 10 to 25 per cent by weight.

10. The composition according to claim 8 in which the polyhydric alcohol is ethylene glycol.

11. The composition according to claim 1 having a viscosity of from about 300,000 to 1,200,000 cps., a filler content above 80% and a volatile component content greater than 5%.

12. The composition according to claim 1 in which the water-resistant polymer emulsion is an acrylic polymer emulsion.

13. The composition according to claim 1 wherein the water-resistant polymer emulsion is selected from the group consisting of polymethyl acrylate, methylmethacrylate-acrylic acid copolymer, and styrene-ethyl acrylate copolymer.

14. The composition according to claim 1 wherein the water-resistant polymer emulsion is a vinyl chloride-acrylic polymer emulsion.

15. The composition according to claim 14 wherein said vinyl chloride-acrylic polymer is selected from the group consisting of vinyl chloride-ethylacrylate copolymer and vinyl chloride-acrylic acid copolymer.

16. The composition according to claim 1 wherein the water-resistant polymer emulsion is a thermosetting acrylic polymer emulsion.

* * * * *